June 6, 1939.  L. F. WHITNEY ET AL  2,161,214
COMBINED REFRIGERATING AND WATER HEATING APPARATUS
Filed Feb. 24, 1938   5 Sheets-Sheet 1

Fig. 1.

INVENTORS;
Lyman F. Whitney,
William E. Whitney,
by ATTORNEYS.
Roberts, Cushman & Woodberry

INVENTORS;
Lyman F. Whitney,
William E. Whitney,
by ATTORNEYS.
Roberts, Cushman & Woodberry

June 6, 1939. L. F. WHITNEY ET AL 2,161,214
COMBINED REFRIGERATING AND WATER HEATING APPARATUS
Filed Feb. 24, 1938 5 Sheets-Sheet 3

Inventors,
Lyman F. Whitney,
William E. Whitney,
by Roberts, Cushman & Woodberry
Attys.

June 6, 1939. L. F. WHITNEY ET AL 2,161,214
COMBINED REFRIGERATING AND WATER HEATING APPARATUS
Filed Feb. 24, 1938 5 Sheets-Sheet 4

INVENTORS;
Lyman F. Whitney,
William E. Whitney,
by ATTORNEYS.
Roberts, Cushman & Woodberry June 6, 1939. L. F. WHITNEY ET AL 2,161,214
COMBINED REFRIGERATING AND WATER HEATING APPARATUS
Filed Feb. 24, 1938   5 Sheets-Sheet 5

Inventor,
Lyman F. Whitney,
William E. Whitney,
by Roberts, Cushman & Woodberry
Attys.

Patented June 6, 1939

2,161,214

UNITED STATES PATENT OFFICE 2,161,214

COMBINED REFRIGERATING AND WATER HEATING APPARATUS

Lyman F. Whitney and William E. Whitney, Cambridge, Mass., assignors, by mesne assignments, to Stator Corporation, a corporation of Rhode Island Application February 24, 1938, Serial No. 192,344

19 Claims. (Cl. 62—115)

This invention relates to an improved apparatus comprising a refrigerating system in combination with a hot water system. In some respects the present invention affords an improved system of the character disclosed in United States Patent No. 1,761,553, granted to Lyman F. Whitney June 3, 1930. In general, the present invention is directed to a system of this character adapted to be employed as a household utility and having suitable operative factors and control means to assure the proper supply of refrigeration and proper supply of hot water despite variable demands for each of these services.

Various refrigerating systems, such as absorption and adsorption systems as well as systems of the character disclosed in the above-identified patent, which employ aspirators to pump refrigerant, receive their energy from a source of heat, which ordinarily may be a burner, and in most localities is likely to be a gas burner. Since systems of this type receive a substantial quantity of heat which must be dissipated, distinct economies may be realized if this heat is employed to heat water for household purposes. It is, however, difficult to afford an efficient arrangement of control means and heat supply means for such a system to assure satisfactory operation under widely varying conditions of demand.

In order to meet these widely variant conditions, we consider it most desirable to provide apparatus of this character with a refrigerating system so controlled that refrigeration is automatically supplied. Under such conditions, whatever heat is available may then be directed to the hot water tank. This heat can be conserved if hot water is drawn from the tank and, if not, it must be wasted, as would be the case were the refrigerator not combined with a water heating system. Thus the refrigerating system supplies a variable minimum amount of heat to the hot water tank. When conditions of hot water demand require an additional supply of heat, an auxiliary heater or booster burner may be provided to make up the difference between the heat received from the refrigerating system and that required for heating the water. To permit these desirable results, we prefer to arrange a booster burner so that it may be lit from the main burner of the refrigerator, which, in effect, indirectly acts as a pilot for the booster burner. Thus an arrangement is provided which avoids the necessity of employing a separate constantly burning pilot for the booster burner, thereby avoiding a waste which is characteristic of many commercial hot water heaters.

Suitable control arrangements are provided to prevent continued flow of gas should the flame at a burner tip become accidentally extinguished. Thus when the supply of fuel to the main burner is interrupted, the supply of fuel to the other burner or burners of the system is also interrupted.

A further feature of the invention relates to the arrangement of selectively controllable means for varying the temperature of the water in the tank to meet the requirements of the particular household.

Further features of the invention relate to the advantageous arrangement of component parts of the system and control means therefor to afford a practical household utility of the class described.

The accompanying drawings show a refrigerating system of preferred form which is combined in a recommended manner with a water heating assembly. First referring to the refrigerant system, which is of the character more fully described and disclosed in the copending application of Lyman F. Whitney, Serial No. 171,325, filed October 27, 1937, it will be understood that such a system is provided with a boiler 1, preferably containing mercury, which is heated by a suitable main burner M. This boiler (see Fig. 3) is in the form of a jacket 5 disposed about a firebox which includes an inner combustion passage 7 and an outer convoluted passage 8 communicating therewith and with a stack 9. A burner and boiler of this general type are disclosed respectively in United States Patents Nos. 1,885,530 and 1,954,398.

The mercury vapor flows upwardly from the boiler 1 through the riser pipe 10 to the first and second stage aspirator nozzles 15 and 25 of the first and second stage aspirator assemblies 16 and 26, respectively. The first stage aspirator is effective in drawing refrigerant vapor from the cooler 14 through the pipe 12, mercury being condensed in the first stage assembly 16 and the resulting condensate passing into the drain 28. Vapor from the first stage assembly passes through an interstage cooler 20 and thence through a duct 21 to the mixing chamber or head of the second stage aspirator assembly 26, where the mercury vapor from the second stage nozzle 25 is effective in further compressing the refrigerant vapor. Condensed mercury from the second stage assembly is received by the drain 30 which also receives mercury from the drain 28. The compressed refrigerant passes upwardly from the second stage aspirator assembly through the vapor duct 32 to the refrigerant condenser 33, which is provided with fins and located in the tank T. Condensate from the condenser passes downwardly through a return pipe 34 which communicates at its lower end with an inclined pipe 35 forming one leg of a trap, the opposite leg of which is provided by the lower part of drain 30.

A pipe 37 is connected to the drain 30 and affords a spill-over connection tending to determine the level of mercury in the trap afforded by pipes 30 and 35 and communicating parts of the refrigerating system. The lower part of tube 37 is connected through a trap 38 with a mercury return pipe 39, the tubes 37 and 39 containing a sufficient head of liquid mercury to balance the boiler pressure. The upper end of pipe 35 is continued in an upstanding pipe section 40 which extends above the level of the liquid in the cooler 14 to a connection with a downwardly extending pipe 41 that communicates with a duct or drain 43 extending downwardly from the bottom of the cooler.

The duct 43 preferably has a large diameter and forms a shallow trap 44 which is connected to a drum 42 that is connected by a pipe 42a with the head of cooler 14. The lower part of drum 42 has a connection with a drain 46 which receives condensed mercury from the mixing chamber of the second stage aspirator assembly. The lower end of this drain is connected by a pipe 47 with an upwardly extending continuation 39a of the return duct 39, the duct section 39a forming a drain to receive mercury from the first stage mixing chamber.

As fully explained in the above-identified copending application of Lyman F. Whitney, returning refrigerant passes through a mercury trap at the junction of ducts 34 and 40 and thence passes through the upper part of duct 40 and through ducts 41 and 43 to return to the cooler. The various parts of the system are arranged so that the mercury drains from the refrigerant circuit and its traps back to the lower mercury-containing part of the system.

A system of this character, as more fully described in the copending application of Lyman F. Whitney, Serial No. 136,612, filed April 13, 1937, may be evacuated and hermetically sealed so that the absolute pressures within the cooler and condenser are below atmospheric pressure. If desired, a system of this character may be provided with a purger, such as described in the above-identified application Serial No. 171,325.

Figure 2:
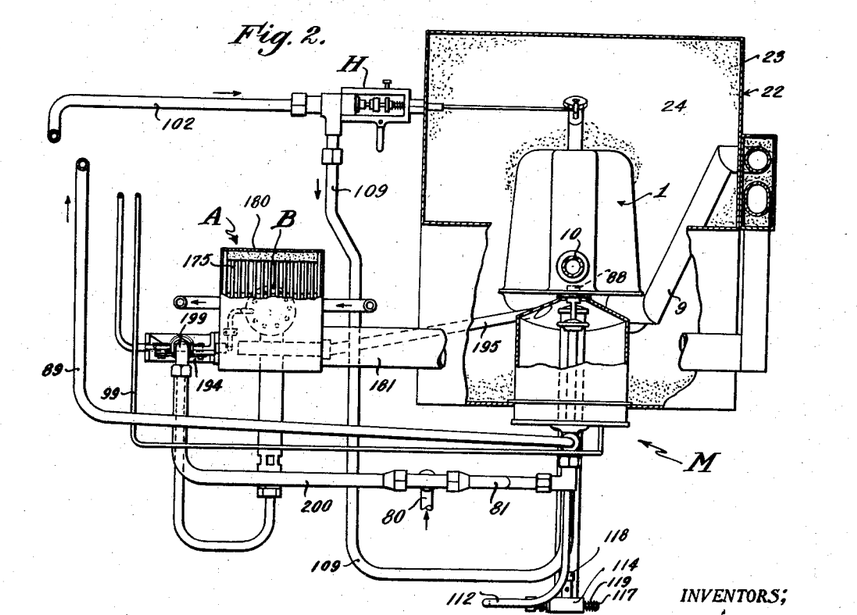
Fig. 2 is a horizontal sectional view of a portion of the lower part of the apparatus showing the main burner, the auxiliary heater and associated parts.
Figure 3:
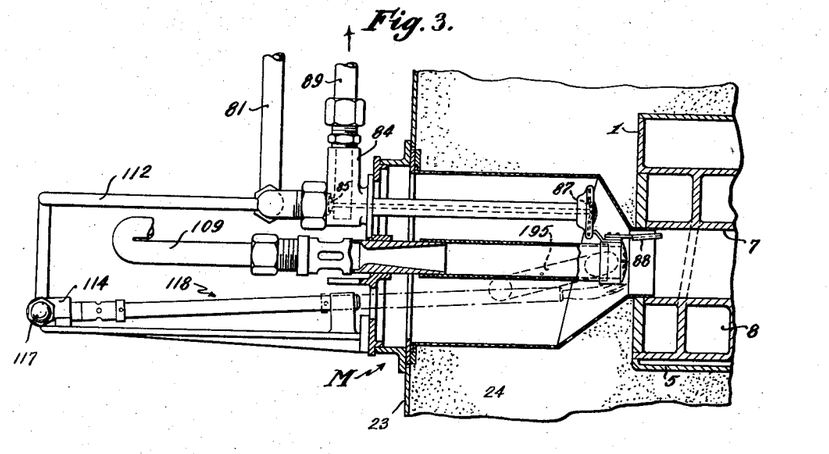
Fig. 3 is a vertical section of the main burner, and a part of the boiler, other parts being shown in elevation.

The boiler 1, riser duct 10, aspirator assemblies 16 and 26, the interstage cooler 20 and adjoining portions of the system are located in an insulating housing 22 which may conveniently comprise a sheet metal casing 23 filled with discrete insulating material 24 (Figs. 2 and 3).

The aspirator assemblies 16 and 26 may be provided with jackets 50 and 51 forming part of an auxiliary fluid circuit. This circuit may contain a suitable circulating medium such as alcohol. The jacket 50 is provided with an upwardly extending pipe 54 which communicates with an alcohol condenser 55 at the upper part of the system, while the jacket 51 is connected by a pipe 56 to the pipe 54. These pipes are arranged so that alcohol which is vaporized by the heat of the mercury in the aspirator assemblies may rise and flow into the condenser 55. The interstage cooler 20 is provided with a jacket 20a which also forms a part of the auxiliary fluid circuit. The upper part of this jacket is connected by a duct 59 to the pipe 54 so that alcohol vapor can also rise from the interstage cooler to the condenser 55. The duct 59 also affords a drain to receive condensate to return the same to the jacket 20a. The jacket 20a is connected by a pipe 60 to the lower part of the jacket 51, the pipe 60 in turn being connected by a pipe 61 to the lower part of the first stage jacket 50. An economizer 67 may be juxtaposed to the lower part of the stack 8 and be provided with connections 68 and 69 to the ducts 60 and 56, respectively, of the auxiliary fluid circuit. Preferably the auxiliary circuit is initially evacuated through a connection 62 so that the contained liquid, e. g., alcohol, may vaporize at a relatively low temperature.

It is evident that the auxiliary fluid circuit just described affords means for conveniently transferring heat from the first and second stage aspirator assemblies and from the interstage cooler and the stack to the alcohol condenser 55 which is located in the hot water tank T.

Having described in general the arrangement of the refrigerating system and its heat dissipating means, we will now refer to the arrangement of the controlling means for this system and to the fuel-supplying means therefor.

Fuel such as gas is supplied to the entire apparatus through an inlet pipe 80. This pipe is provided with a branch 81 (Fig. 3) which extends to a valve housing 84 enclosing a valve 85 controlled by a heat responsive metal disk 87 provided with a heat conductor 88 arranged in juxtaposition to the normal path of the burning gases issuing from the main burner M. When the main burner is operating so that the thermostatic disk 87 is heated and valve 85 thereby kept open, gas may flow from pipe 81 through the valve housing 84 and upwardly through duct 89 to the control assembly C. This assembly C may conveniently be located above the food compartment F which contains the cooler. In practice, a normally inoperative safety pipe 99 may connect a portion of the assembly C with the housing of burner M to comply with certain safety regulations.

The assembly C includes two controllers, the controller 100, which is responsive to the temperature of the interior of the food compartment F and the controller 101 which is responsive to the temperature of the water in the tank T. The upwardly extending pipe 89 is provided with branches to supply gas to each of these controllers. The controller 100 is provided with thermostatic means responsive to the temperature of the food compartment F, such means including the thermostatic bulb 106 within this compartment. Accordingly, the flow of gas through the controlling device 100 to its outlet pipe may be automatically varied in accordance with the demand for refrigeration. A suitable by-pass passage 107, however, is afforded to assure the flow of fuel at a minimum rate to the burner M, even when defrosting is taking place. Thus, the gas flame at the main burner is continuously kept burning. The lower part of the pipe 102 is connected to a safety shut-off device H which under normal operating conditions, unless, for example, the boiler 1 is denuded, permits gas to flow from the lower end of pipe 102 through a pipe 109 which supplies gas to the burner M.

In order to permit lighting of the burner M, a small branch line 112 is connected to the pipe 81 between the pipe 80 and the valve casing 84. The tube 112 communicates with a valve housing 114 which contains a valve controlled by a plunger 117. This plunger is normally held outwardly and the valve is normally held closed by a spring 119 (Fig. 2). When it is desired to start the system and to light the main burner, the plunger is pressed inwardly to permit gas to flow from the tube 112 to the lighter burner 118. The latter is provided with two telescopically arranged burner tubes so that this burner is extensible, the extended part of the burner being shown in its projected position in dotted lines in Fig. 3. Thus, an arrangement is provided whereby the main burner may readily be ignited, the flame from the lighter burner 118 being sufficient to heat the heat conductor 88 and the thermostatic disk 87 so that gas may flow from the pipe 81 through the pipe 89 to the controller 100, thence through the pipes 102 and 108 to the main burner.

It is obvious that the arrangement so far described permits the continuous efficient operation of the refrigerating system, and we will now describe the arrangement of the water-containing portions of the system and the means for supplying auxiliary heat thereto together with the controls therefor.

Preferably the water tank T may be arranged directly above the food compartment F, as more fully disclosed in the copending application of Lyman F. Whitney, Serial No. 202,242, filed April 15, 1938. However, for purposes of illustration the tank T is shown at one side of the food compartment F. This tank preferably is formed of metal of low heat conductivity such as a silicon-bronze alloy. The tank may contain the refrigerant condenser 33 which is located in the lower part of the tank and the alcohol condenser 55 which is disposed above the refrigerant condenser.

The tank T is provided with a pipe 140 for receiving incoming water from the supply main. This pipe is provided with a downwardly extending branch 141 provided with a valve 141ᵃ to permit drainage of water from the tank when desired. The valve 140ᵃ should, of course, be closed and a faucet be opened before the valve 141ᵃ is opened. The upper and normally the hottest part of the tank T is provided with an outlet 139 connected to the pipe for supplying water to the faucets of the house. The outlet 139 is also connected through a short duct 142 to a quick acting dump valve 144, the latter when opened being arranged to emit hot water into a suitable drain 143 which may direct the heated water to a sewer connection. The valve 144 may be of the electromagnetically controlled type, as disclosed more fully in the copending application of Lyman F. Whitney, Serial No. 192,343, filed on even date herewith. This valve is electrically connected to a control switch assembly 146 disposed at the side of the tank and connected to the current supply circuit of the house by leads 148. The switch assembly 146 includes two switches responsive respectively to the temperatures of heat responsive bulbs 150 and 151. Bulb 150 is disposed in the tank T substantially on a level with the lower part of the condenser 55, while the other bulb 151 is disposed somewhat below the bulb 150 and substantially on a level with the upper part of the condenser 33. As more fully explained in the last above-identified copending application, such an arrangement permits water to be emitted either when the temperature of the water in the upper part of the tank and in the region of the heat dissipator 55 exceeds a predetermined high temperature or when the temperature of the water in the lower part of the tank, i. e. the water about the condenser 33 exceeds a lower predetermined temperature. Thus, for example, this arrangement avoids the development of undesirably high temperatures in the refrigerant condenser.

Figure 7:
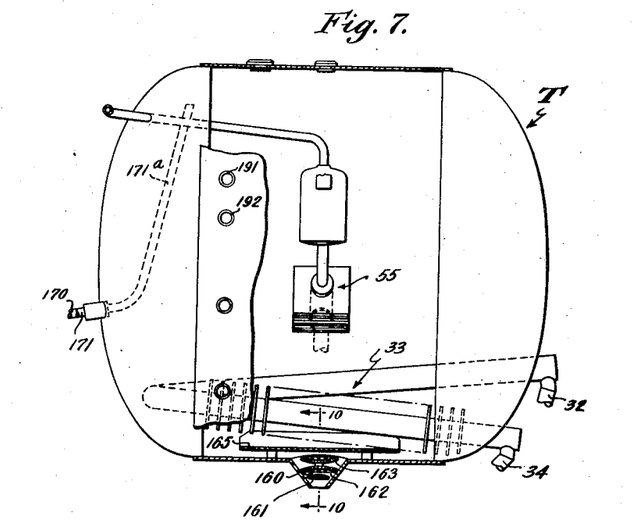
Fig. 7 is a similar rear elevation of the tank.

The tank T is provided with a funnel-like connection 160 (Fig. 7) with the pipe 140, and suitable perforated disks 161, 162, and 163 are arranged in this funnel-like portion to prevent the passage of water into the tank at high velocity.

Figure 10:
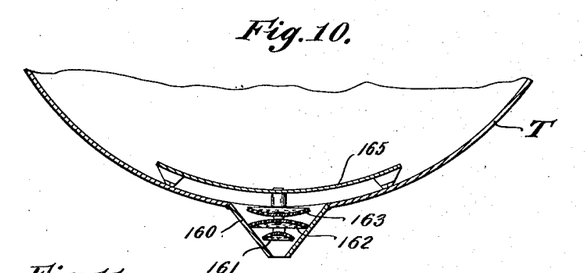
Fig. 10 is a sectional detail of the lower part of the tank on the line 10—10 of Fig. 7.

In order further to assure stratification of the water, a curved deflector plate 165 (Fig. 10) is arranged above the inlet opening. The specific arrangement of these parts of the water tank assembly is more fully disclosed in copending application Serial No. 192,343.

The dump valve and the control means therefor are so arranged that less than 15% and preferably less than 10% of the stored water is emitted when the valve is opened.

The controller 100 is so arranged that under ordinary operating conditions, the minimum amount of gas supplied to the burner M in response to low refrigeration demand may be at least 40% of the maximum amount supplied to the burner M under conditions of high refrigeration demand.

The tank T is also provided with a safety valve 154 which may be of the conventional type and which is connected to the outlet 143 by a duct 156. As more fully disclosed in the last identified copending application, the valve 154 automatically acts to permit emission of hot water only in response to abnormally high temperatures and/or pressures.

Figures 4, 5:
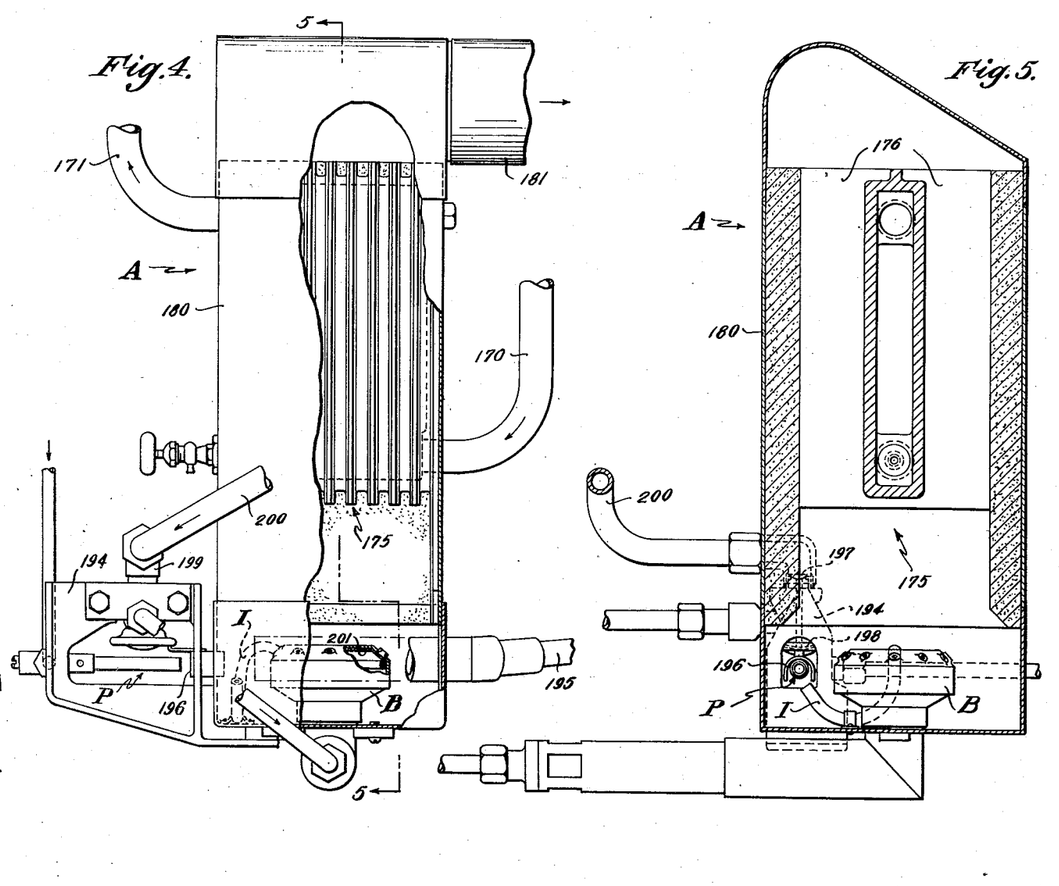
Fig. 4 is a broken front elevational view of the auxiliary heater.
Fig. 5 is a section on line 5—5 of Fig. 4.
Figures 6, 8:
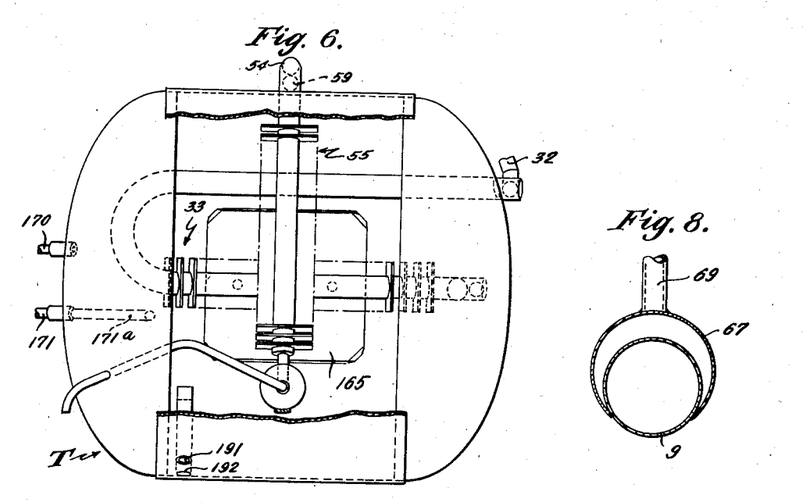
Fig. 6 is a top view of the water-containing tank, parts being broken away and shown in section.
Fig. 8 is a sectional detail showing the arrangement of the stack and economizer.
Figure 9:
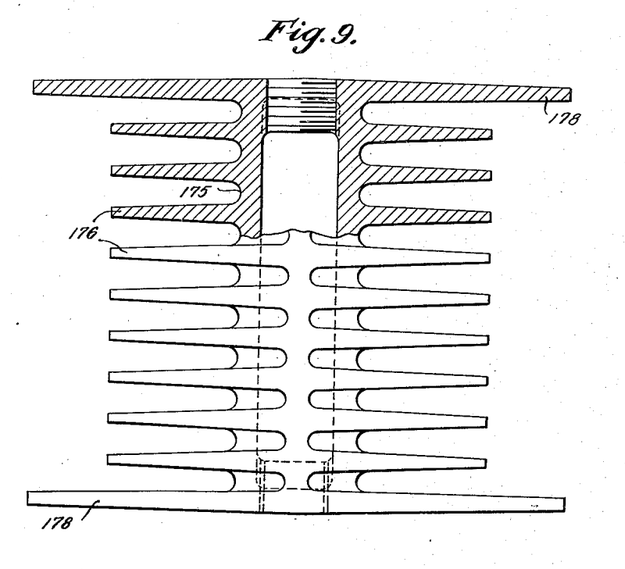
Fig. 9 is a top view of the water-containing unit of the auxiliary heater with a part broken away and shown in section.

An auxiliary water heater A is arranged at the lower part of the system rather near the boiler 1 and burner M, but outside of the insulating housing 22. Suitable pipes 170 and 171 connect the tank T with this heater A, the return pipe 171 having an upwardly extending continuation 171ᵃ with an open end in the upper part of the tank T. The construction of the auxiliary heater A is shown more particularly in Figs. 4, 5 and 9. This heater may comprise a shallow metal box 175 in the form, for example, of an aluminum casting having relatively wide fins 176 extending out at either side thereof. The member 175 is also provided with end plates 178 which extend outwardly at even greater distances than the fins and in substantial parallelism therewith.

A sheet metal casing 180 is disposed about this member, having walls engaging the end plates 178 and having its upper portion communicating with a horizontal vent duct or stack 181 which extends over to the region of the stack 9 for the main burner 1. These stacks may conveniently be joined at the upper part of the system. The pipe 170 which supplies water to the auxiliary heater A is connected to the lower part of the box-like member 175, as shown, and the pipe 171 is connected to the upper part of the same.

Gas is normally prevented by the controller from flowing to the auxiliary heater A. The controller 101 includes a valve responsive to the temperature of a bulb 190 which may be disposed in either one of two sockets 191 and 192 in the side of the tank T, these sockets being spaced vertically from each other and the bulb being located in the desired socket to cause the rapid heating of the proper amount of water to meet the requirements of the particular household where the system is being used. When the temperature of the water surrounding the bulb 190 falls below a predetermined point, gas flows from the pipe 89 through the controller 101 and the pipe 193 to the pilot burner P for the booster burner B. This pilot burner P is located in a skeletonized casing 194 disposed at one side of the auxiliary heater A and is arranged in substantial alignment with an ignition tube 195 extending through the opposite side of the casing 180 and through the side of insulating casing 22 to the region of the tip of the main burner M. Accordingly, when gas is permitted to flow from the pilot P, it passes through the ignition tube 195 to the region of the flame at the main burner tip, where this gas is ignited. The resulting flame may move backwardly through the tube 195, finally igniting the gas as it issues from the tip of the pilot P. When the pilot is lit but the booster is not operating, the gases from the pilot flame pass to a substantial extent through the tube 195 and join the hot gases from the main burner in flowing through the passages of the boiler and through the main burner stack. When the booster starts operating, the gases from the pilot may then tend to flow about the chamber 175 and through the booster stack 181. It is evident that if a construction of this type is employed with a permanently burning pilot for the booster a substantial fraction of the heat from the pilot would be usefully employed in heating propellant in the boiler 1 when the booster was not operating.

A suitable thermostatic disk 198 is arranged above the pilot P (Fig. 5) and is associated with a heat conductor 196 and a valve 197 disposed in a casing 199 and controlling the flow of gas from a pipe 200 to the booster burner B. This pipe 200 is connected to the main gas supply line 80 at the lower part of the system, as indicated diagrammatically in Fig. 1. Accordingly, when the temperature of the water in the tank falls below a predetermined point, as determined by the thermostatic bulb 190, gas is supplied to the pilot P, this burner being ignited by the main burner M and serving to heat the thermostatic control device 198 which may then permit gas to flow to the booster burner B. Both pilot burner P and booster burner B continue in operation until the flow of gas to the pilot P is interrupted by the controller 101 in response to an increase in the temperature of the water in the tank. Thereupon, the flame at the tip of pilot P is extinguished, the thermostatic disk 198 is cooled, the flow of gas through the valve housing 199 is interrupted, and the flame from the booster burner B is also interrupted.

The burner B preferably includes a cylindrical casing having a plurality of protuberant portions providing gas-emitting vents. A suitable foraminated sheet, such as a wire screen 201, is disposed within the upper part of the burner B and beneath these protuberances.

A small intermediate burner I may be associated with the burner B. The burner I may comprise a tube having a gas-receiving end secured over one of the perforated protuberances of the burner B and extending downwardly to a lower portion supported on the bottom of the casing 180. The tube then extends upwardly to provide a tip disposed adjoining the tip of the pilot P (see Fig. 4). When gas is supplied to the booster burner B in the manner which has been described, obviously some of this gas passes through the tube of the intermediate burner I, so that an upwardly directed flame jet is thereupon provided at the tip of this burner. Accordingly, if for any reason the flame of pilot P is accidentally extinguished, gas issuing from the same will be immediately ignited by the flame from the intermediate burner I, so that, in such an event, the operation of the booster burner B would not be unnecessarily interrupted. Furthermore, if the flame from pilot P does not immediately light gas issuing from burner B, this gas rises into the space above the burner B and is thereupon ignited by the upwardly projected flame from the intermediate burner I.

As previously described, the flow of gas to the pilot P is interrupted when the temperature of the water in the tank T reaches a predetermined point, as determined by the controller assembly C and the thermostatic bulb 190. This results in the cooling of the heat conductor 196 above the pilot P, and in the action of the thermostatic disk 198 in closing the valve 197 controlling the supply of the gas to booster burner B and the intermediate burner I. Furthermore, should the booster burner be operating, when for any reason the operation of the main burner is interrupted, as for example due to temporary interruption of the supply of gas to the main burner, gas is no longer supplied to the pilot P due to the action of the valve 85. Accordingly, any interruption in the operation of burner M results in an interruption to the operation of burner P. When the flow of gas to the latter is interrupted, the temperature of heat conductor 196 falls and valve 197 is actuated to interrupt the flow of gas to the booster burner B and the intermediate burner I.

Figure 1:
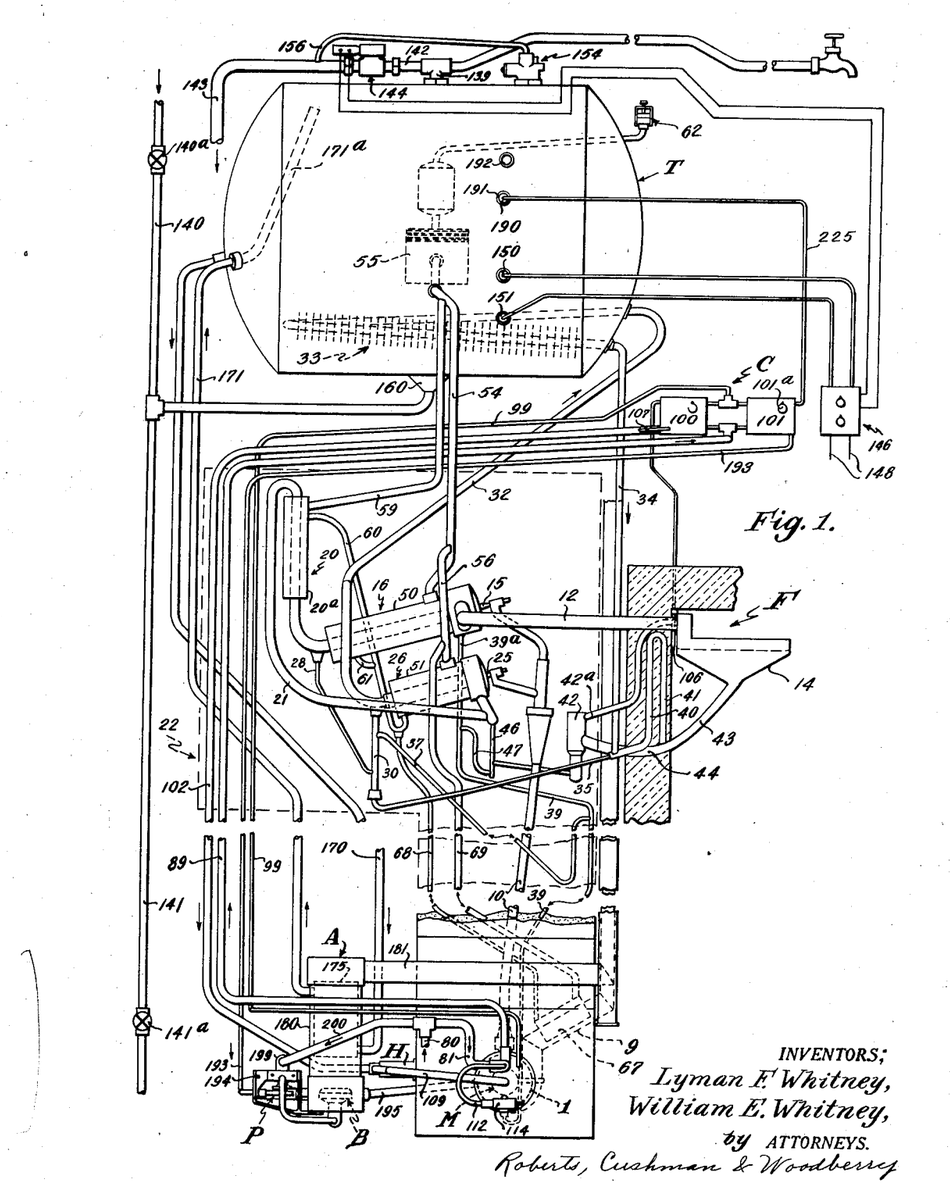
Fig. 1 is a diagrammatic view of household utility apparatus of a type provided by the present invention.

It is to be understood that when the booster is operating in the normal manner, heat may be supplied to the water in the auxiliary heater by the pilot P and the intermediate burner I, as well as the booster burner B. The control device 101 is provided with a manually adjustable knob 101ª (Fig. 1). Thus the device may cause operation of the booster burner B when the temperature of the water surrounding bulb 191 falls below a relatively high point, such as 150° F., or the device may be adjusted so that the water temperature must fall to a substantially lower point before the booster burner will start operating. Preferably the range of adjustment is so great that the knob may be set, if desired, so that the operation of the booster burner will not be initiated even if unheated water (water at a temperature as low as 70° F. and preferably as low as 40° F.) surrounds bulb 191.

Figure 11:
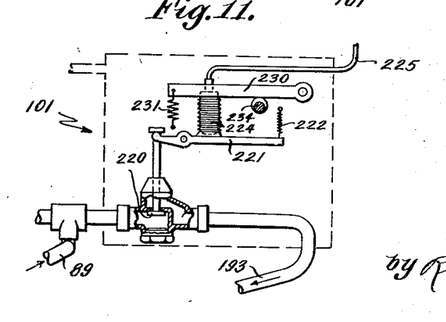
Fig. 11 is a diagrammatic view of a portion of the control device for the booster burner and its pilot.

Fig. 11 affords a diagrammatic illustration of the control device which includes a valve 220 for preventing the flow of gas from the duct 89 to the tube 193. This valve is provided with a spindle contacting one end of a lever 221 mounted on a fixed pivot. The opposite end of lever 221 is connected to a tension spring 222. This spring tends to swing the lever 221 to cause the valve 220 to open. An expansible-contractible bellows 224 is connected by a flexible tube 225 to the thermostatic bulb 191. When the bellows 224 expands as the water in tank T is heated, it tends to swing the lever 221 against the action of spring 222 to close the valve 220. On the other hand, when the temperature of the water falls, the bellows 224 contracts, tending to permit the spring 222 to be effective in opening the valve 220 and thus allow gas to pass to the pilot P.

The bellows is disposed between the lever 221 and a pivoted arm 230, the free end of which is connected to a tension spring 231. An eccentric 234 is arranged to be rotated by the knob 101a to vary the position of the arm 230. In the position of the eccentric shown in Fig. 11, the bellows may be effective in permitting the valve 220 to open when the temperature of the water falls. When, however, the eccentric 234 is adjusted to permit the arm 230 to move nearest to the lever 221, the bellows may contract to its minimum size, for example, when the water surrounding bulb 191 is unheated, and may still prevent the spring 222 from opening the valve 220.

It is therefore evident that an adjustment is provided which causes the operation of the booster burner when the temperature of water falls to a point such as 150° F. and that the setting of the adjustment may be varied, if desired, so that the temperature of the water must fall substantially lower before operation of the booster burner is started. Furthermore, at the end of the range of adjustment the setting may be such that the operation of the booster burner is prevented even when unheated water fills the tank T. Accordingly the adjustment not only permits variation in the temperature of water which will cause operation of the booster, but also, in effect, acts as a shut-off to make the booster burner inoperative, if desired.

It is evident that the present invention affords an advantageous arrangement of fuel-operated heating means, such as gas-operated heating means, for a combined refrigerating and water heating system, and particularly that the present invention affords a simple, effective and economical arrangement of gas burners permitting the intermittent automatic operation of a booster to supply additional heat to the hot water system when such heat is desired, but that the present invention effectively avoids the necessity of providing a constantly operating pilot which would be wasteful of gas and uneconomical, particularly in households where operation of the booster would occur very frequently.

It should be understood that the present disclosure is for the purpose of illustration only and that this invention includes all modifications and equivalents which fall within the scope of the appended claims.

We claim:

1. Apparatus of the class described comprising a refrigerating system including a heater the operation of which causes circulation of fluid through the system and including a heat dissipator, a hot water tank, said tank and dissipator being arranged in heat transfer relation, a booster burner to supply additional heat to the tank, and means for igniting fuel issuing from said booster burner by heat from said heater.

2. Apparatus of the class described comprising a refrigerating system including a burner the operation of which causes circulation of fluid through the system and including a heat dissipator, a hot water tank, said tank and dissipator being arranged in heat transfer relation, an auxiliary heater for supplying additional heat to the tank, and a control device responsive to the temperature of said tank to cause fuel to flow to the auxiliary heater, and means to cause said fuel to be ignited by flame coming from said burner.

3. Apparatus of the class described comprising a refrigerating system including a burner and a fluid circuit with a heat dissipator, a hot water tank, said tank and dissipator being arranged in heat transfer relation to each other, a burner for supplying additional heat to said tank, gas supply lines to direct fuel to each of said burners, a gas tube extending from the region of one of said burners to region of the other of said burners, and a control valve to permit the flow of gas to the second-named burner, said tube being arranged so that the gas may flow to the region of the first-named burner where it is ignited and the flame may move back through the tube to the second-named burner to light the latter.

4. Apparatus of the class described comprising a refrigerating system including a burner and a fluid circuit having a heat dissipator, a hot water tank in heat transfer relation to said dissipator, a booster burner for supplying additional heat to said tank, a pilot for said booster burner, said pilot being arranged so that fuel issuing therefrom may be lit by the flame of the first-named burner so that fuel issuing from the booster burner may thereupon be lit.

5. Apparatus of the class described comprising a refrigerating system including a main burner and a fluid circuit having a heat dissipator, a hot water tank in heat transfer relation to said dissipator, a booster burner for supplying additional heat to said tank, a pilot for said booster burner, a gas supply line for supplying gas to the pilot, said pilot being arranged so that fuel issuing therefrom may be ignited by the flame of the main burner so that the pilot is then effective in lighting the booster burner, and control means effective to interrupt the flow of gas through said supply line and to extinguish the flames of said booster burner and pilot.

6. Apparatus of the class described comprising a refrigerating system including a main burner and a fluid circuit having a heat dissipator, a hot water tank receiving heat from said dissipator, a booster burner for supplying additional heat to said tank, a pilot burner associated with the booster burner, a gas supply line for supplying gas to said pilot burner, control means responsive to the temperature of the water in said tank to permit the flow of gas through said line, a duct extending from the region of the pilot burner to the region of the main burner and receiving gas initially supplied by said line, said duct being arranged so that this gas is ignited by the main burner and the resulting flame travels backwardly through the duct to light the pilot burner which in turn lights the booster burner.

7. Apparatus of the class described comprising a refrigerating system including a main burner and fluid circuit having a heat dissipator, a hot water tank receiving heat from said dissipator, an auxiliary water heater connected to the hot water tank by water piping, said auxiliary heater being provided with a burner, and means operative to supply fuel to said last-named burner in response to a predetermined reduced temperature of the water in said tank, said last-named burner being arranged so that the fuel thus supplied is ignited by the flame of the main burner.

8. Apparatus of the class described comprising a refrigerating system including a boiler and a heat dissipator and a heater associated with the boiler, a hot water tank in heat transfer relation to said dissipator, a booster for supplying additional heat to said tank, and control means responsive to the temperature of the water in said tank for causing the operation of said booster, said control means being arranged so that it does not operate to cause the operation of the booster when the heater is not operating.

9. Apparatus of the class described comprising a refrigerating system including a main burner and a fluid circuit having a heat dissipator, a hot water tank receiving heat from said dissipator, a booster burner for supplying additional heat to said tank, a pilot burner associated with the booster burner, a gas supply line having branches extending to said main, booster and pilot burners, control means responsive to the temperature of the water in said tank to permit the flow of gas through the branch to the pilot burner when the temperature of the water falls below a predetermined point, said pilot burner being arranged so that fuel therefrom is ignited by the flame of the main burner, and a thermally controlled valve in the branch of said line which extends to the booster burner, said valve opening in response to heat from said pilot burner, whereby gas may be supplied to the booster burner and said gas may be ignited.

10. Apparatus of the class described comprising a refrigerating system including a main burner and a fluid circuit having a heat dissipator, a hot water tank, said dissipator being in heat transfer relation to said tank, a booster burner for supplying additional heat to said tank, a pilot burner associated with the booster burner, a gas supply line having branches extending to said main, booster and pilot burners, control means responsive to the temperature of the water in said tank to permit the flow of gas through the branch to the pilot burner when the temperature of the water falls below a predetermined point, said pilot burner being arranged so that fuel therefrom is ignited by the flame of the main burner, a thermally controlled valve in the branch of said line which extends to the booster burner, said valve opening in response to heat from said pilot burner, whereby gas is supplied to the booster burner and the gas thus supplied may then be ignited, and gas control means for causing interruption of the flow of gas to each of said burners when the operation of the main burner is interrupted.

11. Apparatus of the class described comprising a refrigerating system including a main burner and a heat dissipator, a hot water tank, said tank and dissipator being arranged in heat transfer relation, a booster burner to supply additional heat to the tank, control means responsive to a reduced temperature of water in said tank for normally initiating flow of fuel to the booster burner, the booster burner being arranged so that said fuel may be ignited by the flame of the main burner, and means responsive to the temperature of the main burner for preventing flow of fuel to said booster burner when the main burner stops operating, whereby a reduced water temperature does not result in fuel flowing to the booster burner if the operation of the main burner has been interrupted.

12. Combined refrigerating and water heating apparatus comprising a refrigerating system including a burner disposed at the lower part of the system and arranged to cause the circulation of fluid through the system, said system also including a heat dissipator, a water tank receiving heat from said dissipator and disposed above the major portion of the refrigerating system, an auxiliary heater including a liquid container and a booster burner, and a fluid circuit extending between said heater and the tank, said booster burner being located near the lower part of the system and being arranged so that fuel issuing therefrom is ignited from the first-named burner.

13. Combined refrigerating and water heating apparatus comprising a refrigerating system including a main burner disposed at the lower part of the system and arranged to cause the circulation of fluid through the system, said system also including a heat dissipator, a water tank receiving heat from said dissipator and disposed above the major portion of the refrigerating system, an auxiliary heater including a liquid container, a booster burner and a fluid circuit extending between said container and the tank, said booster burner being located near the lower part of the system but being spaced from the main burner, a pilot for said booster burner, a flame duct extending from the region of said pilot to the region of said burner, and means responsive to a decrease in the temperature of the water in said tank to cause gas to issue from said pilot and flow through said duct to the region of the main burner, whereby said gas may be ignited by the main burner and the resulting flame may move backwardly through said tube to the tip of said pilot burner, whereby said booster burner may be ignited.

14. Combined refrigerating and water heating apparatus comprising a refrigerating system including a main burner disposed at the lower part of the system and arranged to cause the circulation of fluid through the system, said system also including a heat dissipator, a water tank receiving heat from said dissipator and disposed above the major portion of the refrigerating system, an auxiliary heater including a liquid container, a booster burner and a fluid circuit extending between said container and the tank, said booster burner being located near the lowest part of the system, a pilot for said booster burner, a flame duct extending from the region of said pilot to the region of said main burner, and means responsive to a decrease in the temperature of the water in said tank to cause gas to issue from said pilot and flow through said duct to the region of the main burner so that the gas will be ignited by the main burner and the resulting flame move back to the tip of the pilot, a heat-responsive valve controlling the flow of gas to said booster burner, said valve opening in response to an increase in the temperature of the pilot so that the flame at the tip of the pilot burner will cause the opening of said valve and the consequent flow of gas to the booster burner, whereupon the gas issuing from the booster burner may be ignited by the flame of the pilot burner.

15. Combined refrigerating and water heating apparatus comprising a refrigerating system including a main burner disposed at the lower part of the system and arranged so that operation thereof causes the circulation of fluid through the system, said system also including a heat dissipator, a water tank at the upper part of the system arranged to receive heat from said dissipator, a heat insulating housing surrounding said main burner, an auxiliary heater including a liquid container, a booster burner and a fluid circuit extending between said container and the tank, said booster burner being located near the lower part of the system but in spaced relation to said insulating housing, a pilot for said booster burner, a flame duct extending from the region of the tip of said pilot into said insulating housing and to the region of said main burner, and means responsive to a decrease in the temperature of the water in said tank to cause gas to issue from said pilot and flow through said duct to the region of the main burner so that the gas may be ignited by the main burner and the resulting flame move back to the tip of the pilot, said pilot being arranged so that the flame then ignites gas issuing from said booster burner.

16. Apparatus of the class described comprising a refrigerating system including a heater and a heat dissipator, a water tank receiving heat from the dissipator, a booster burner, a valve for controlling the supply of fuel to the booster burner, said booster burner being arranged so that fuel supplied thereto may be ignited by heat from said heater, a control device responsive to a reduced temperature of water in said tank for causing actuation of said valve and consequent fuel flow to the booster burner, and a manually adjustable member for varying the influence of said device on the valve, said member being adjustable so that the water temperature which will result in valve actuation may be varied, the member being arranged so that the range of adjustment is great enough to provide a setting wherein even water at a temperature as low as 70° F. will not cause actuation of the valve by said control device.

17. Apparatus of the class described comprising a refrigerating system having a heat dissipator, a water tank receiving heat from said dissipator, an auxiliary heater for supplying additional heat to said tank, a control instrumentality responsive to a reduced temperature of water in said tank for causing operation of said auxiliary heater, a manually controllable adjusting device for said instrumentality arranged to vary the responsiveness of the instrumentality to reduced water temperatures, said adjusting device being capable of being set so that water having a temperature as low as 40° F. will not cause operation of the auxiliary heater, whereby the adjusting device may be employed to make the auxiliary heater inoperative.

18. Apparatus of the class described comprising a refrigerating system having a heat dissipator, a water tank receiving heat from said dissipator, an auxiliary heater for supplying additional heat to said tank, a control instrumentality responsive to the temperature of water in said tank for causing operation of said auxiliary heater, said instrumentality including an expansible-contractible element, a control device actuable in response to contraction of said element to cause operation of said auxiliary heater, and a manually controllable adjusting device for varying the influence of said element on the device, said adjusting device having a range so great that it may be set to permit contraction of said element even in response to water at a temperature of 70° F. without causing actuation of said device, whereby the adjusting device may function to make the auxiliary heater inoperative.

19. Apparatus of the class described comprising a refrigerating system including a main burner and a heat dissipator, a hot water tank, said tank and dissipator being arranged in heat transfer relation, a booster burner to supply additional heat to said tank, a pilot for said booster burner, control means for supplying fuel to the booster burner in response to a reduced temperature of water in said tank, a flue for receiving hot gases from the booster burner, a flue for receiving hot gases from the main burner, a duct extending from the region of the top of the pilot to the region of the main burner, and means permitting flow of fuel to said booster burner in response to a reduced temperature of water in said tank.

LYMAN F. WHITNEY.
WILLIAM E. WHITNEY.